UNITED STATES PATENT OFFICE.

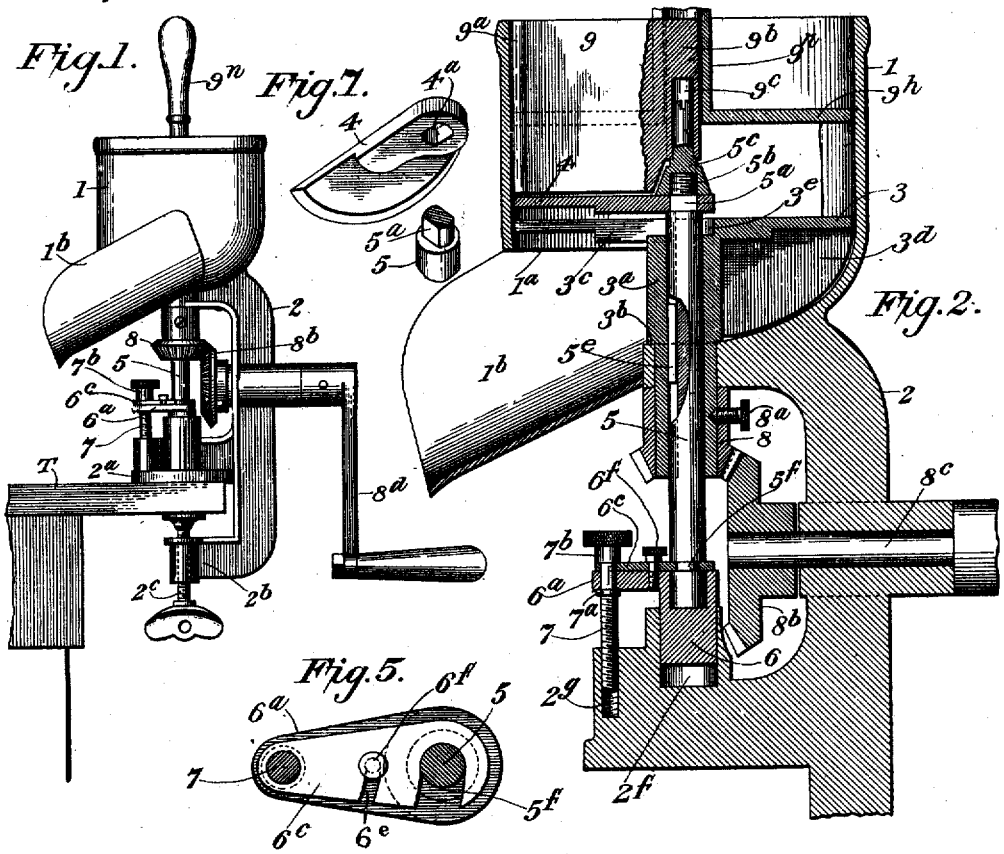
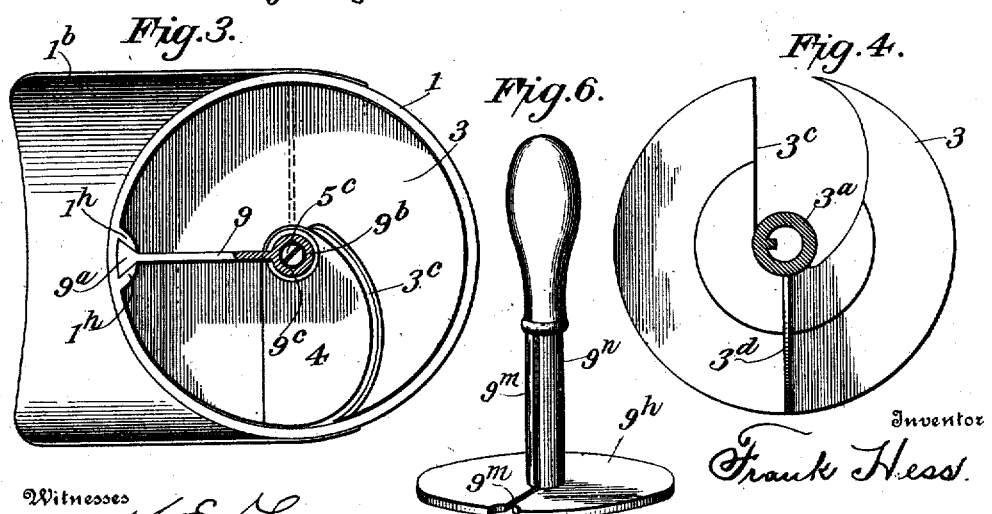

FRANK HESS, OF DAVENPORT, IOWA.

FRUIT, VEGETABLE, AND MEAT SLICING MACHINE.

No. 918,320.　　　　Specification of Letters Patent.　　　Patented April 13, 1909.

Application filed January 3, 1908. Serial No. 409,194.

*To all whom it may concern:*

Be it known that I, FRANK HESS, of Davenport, in the county of Scott and State of Iowa, have invented certain new and useful Improvements in Fruit, Vegetable, and Meat Slicing Machines; and I hereby declare that the following is a full, clear, and exact description thereof, reference being had to the accompanying drawings, which form part of this specification.

This invention is an improvement in fruit, vegetable and meat slicing machines, and it consists in the novel construction of the machine hereinafter described and claimed, and illustrated in the accompanying drawings.

In the drawings—Figure 1 is a side elevation of the complete machine. Fig. 2 is an enlarged vertical section through the operative parts thereof. Fig. 3 is top plan view of the hopper partly broken away. Fig. 4 is a bottom plan view of the disk 3. Fig. 5 is a detail plan view showing the catch for holding shaft 5 in position. Fig. 6 is a perspective view of the follower. Fig. 7 is a detail perspective view of the knife, and upper end of shaft 5, separated.

The machine comprises a hopper 1, which is preferably cylindric, and has an opening $1^a$ in its bottom, beneath which is a discharge spout $1^b$, as shown. The hopper is supported upon a stand 2, which is provided below the hopper with bearings for vertical and horizontal shafts, as hereinafter described, and with suitable means at the bottom for attaching the stand to a support.

As shown the stand is constructed for attachment to a table top T, and has a bracket portion $2^a$ adapted to rest upon the table-top, and an arm $2^b$ adapted to project under the table-top and provided with a hand-operated clamping screw $2^c$ as shown.

Arranged in the hopper 1 is a disk 3, which forms the working bottom of the hopper, and is provided with a central depending sleeve $3^a$ which extends down through a vertical opening in the bottom of the hopper, and is shouldered as at $3^b$ to support the disk in proper position in the hopper.

In the disk 3 is a radial slot $3^c$ which is preferably curved on its forward or advancing edge (*i. e.* that in the direction of rotation of the disk); and within this slot is a removable cutter or knife 4 which corresponds in contour to the slot, and has its forward, cutting edge, curved like the forward edge of the slot. The knife has an angular aperture in its inner end which fits over the correspondingly shaped upper end $5^a$ of a vertical shaft 5, and above part $5^a$ the shaft 5 is reduced and threaded, as at $5^b$, and a nut $5^c$ is screwed thereon, to fasten the blade in position.

The disk 3 is recessed at center, as shown at $3^e$, so that the blade 4 can be lowered in the slot if desired until the upper surface of the blade comes flush with the upper surface of the disk. The forward curved edges of the blade 4 and slot $3^c$ start at one edge or side of the shaft, and extend on a convolute curve to the periphery of the disk as shown, so that the blade will make a kind of draw-cut upon the material in the hopper. The cut away portion $3^e$ of the disk adjacent the inner end of the slot and knife allows material cut at the inner end of the blade to drop down below the disk. Any material that lodges in the hopper below disk 3 will be swept out into the discharge spout $1^b$ by a scraper-blade $3^d$ attached to the under side of the disk.

The shaft 5 is keyed to the disk 3, as shown at $5^e$, so that the disk must rotate with the shaft. Said shaft depends through the sleeve $3^a$, and its lower end is supported in a cup 6, which is loosely fitted in a socket $2^f$ in the part $2^a$, and is provided with a laterally projecting arm $6^a$ which is connected with a screw 7 tapped into a threaded socket $2^f$ in part $2^a$; said screw has a collar $7^a$ below arm $6^a$, and a thumb-disk $7^b$ on its upper end by which it can be manipulated, so as to raise and lower cup 6, and therefore raise or lower shaft 5 which is supported in said cup, and thus by manipulating screw 7 the blade 4 can be raised or lowered in relation to disk 3, and the thickness of the slices cut by the machine regulated accordingly.

On arm $6^a$ may be pivoted, by screw 7 or other suitable means, a catch $6^c$, the free end of which is notched as shown, so that it can be moved into engagement with an annular groove $5^f$ in shaft 5, so as to lock the shaft 5 to the cup, while not preventing rotation of the shaft. The catch $6^c$ may have a slot $6^e$, to engage a headed pin $6^f$ fast to arm 6, to hold down the free end of the catch when engaged with groove $5^f$.

The disk and knife may be rotated as follows: On sleeve $3^a$ is a bevel gear 8, fast to the sleeve by a thumb-screw $8^a$. This gear meshes with a larger gear $8^b$ on a driving shaft $8^c$ journaled in the stand 2, and operated by any suitable means, a hand-crank $8^d$ being shown in the drawings.

The material may be prevented from rotating in hopper 1, by means of a removable partition 9, which has a dove-tail flange $9^a$ on its outer edge, engaging a dove-tail groove $1^h$ on the inner side wall of the hopper. Said partition has a preferably cylindric enlargement or rib $9^b$ on its inner edge which stands in axial alinement with shaft 5, and the lower end of said enlargement $9^b$ may have a socket $9^c$ fitting over the cylindric upper end or extension of nut 5 so as to keep the inner end of the partition in place. The rib $9^b$ may also serve as a guide for the follower $9^h$ which is radially slotted, as at $9^m$ to accommodate the partition 9, and the stem $9^n$ of the follower being also hollow and slotted so as to fit over and slide upon the enlargement or rib $9^b$ of the partition.

The operation is simple: The follower is removed, the material to be cut placed in the hopper, the follower replaced, and the crank operated. By manipulating screw 7 the thickness of the slices cut can be regulated. When cutting round vegetables and small fruits, the partition 9 should be first put in the hopper; but when meat, and leafy vegetables are to be cut, the partition can be removed if desired.

When it is desired to clean the machine, the thumb-screw $8^a$ can be loosened, and the catch $6^c$ disengaged from shaft 5; then the disk 3, knife 4 and shaft 5 can be readily lifted out, so that every part can be easily and thoroughly cleansed.

Having described my invention what I claim as new and desire to secure by Letters Patent is:

1. In a slicing machine, the combination of a hopper, a disk supported upon the bottom of the hopper and having a radial slot curved on its forward edge, and a tubular shaft extending into the hopper through its bottom and connected with said disk; a second shaft extending through the tubular shaft and disk, a knife attached to the upper end of said second shaft and occupying the slot in the disk, and means for vertically adjusting the second shaft and knife relatively to the disk.

2. In a slicing machine, the combination of a hopper, a disk in the hopper having a radial slot and provided with a depending tubular sleeve supported upon the bottom of the disk, a shaft extending axially through the sleeve and disk, a knife detachably attached to the upper end of said shaft and resting in the slot of the disk, means for vertically adjusting the shaft and knife, a gear detachably attached to the lower end of said sleeve below the hopper, and means for driving said gear.

3. The combination of a hopper, a rotatable disk therein having a slot, means for rotating the disk, a shaft extending through the disk, and a knife attached to the upper end of said shaft and loosely fitted to the slot in the disk; with an adjustable cup in which the lower end of said shaft is stepped, a screw for adjusting said cup and thereby the shaft and knife, and means for detachably connecting the shaft with the cup so as to prevent longitudinal movement of the shaft relative to the cup but permit rotation of the shaft.

4. The combination of a hopper, a rotatable disk therein having a radial slot and a depending tubular sleeve stepped in the bottom of the hopper, a gear on the said sleeve below the hopper, means engaging said gear for rotating the disk, a shaft extending through the sleeve and disk, a knife attached to the upper end of said shaft and fitted to the slot in the disk, and an adjustable cup in which the lower end of said shaft is stepped, means for adjusting said cup vertically, and means for connecting the shaft with the cup so as to prevent longitudinal movement of the shaft relative to the cup.

5. In a cutting machine, the combination of a hopper provided with partition guides, a knife rotatably mounted in said hopper, a removable vertical partition in the hopper above the knife engaging said guides and extending from the wall to the center of the hopper, and a follower in the hopper having a radial slot for the accommodation of the partition.

6. The combination of a hopper, a disk and cutter therein, a rotatable shaft extending into the hopper and projecting above the disk, a removable radially disposed partition in the hopper above the disk having a socket in its inner end to receive the upper end of said shaft, substantially as described.

7. The combination of a hopper, a rotatable disk therein having a radial slot, means for rotating the disk, a shaft extending through the disk and projecting above the same, a knife attached to said shaft above the disk, and means for vertically adjusting the shaft; with a removable partition in the hopper above the disk, having a socket in its inner end fitted to the upper end of said shaft, and a radially slotted follower in the hopper.

In testimony that I claim the foregoing as my own, I affix my signature in presence of two witnesses.

FRANK HESS.

Witnesses:
JOHN M. NELSON,
HENRY M. YAGER.